Oct. 13, 1959

W. M. STRATFORD 2,908,634

HYDROCARBON CONVERSION PROCESS

Filed Feb. 8, 1956

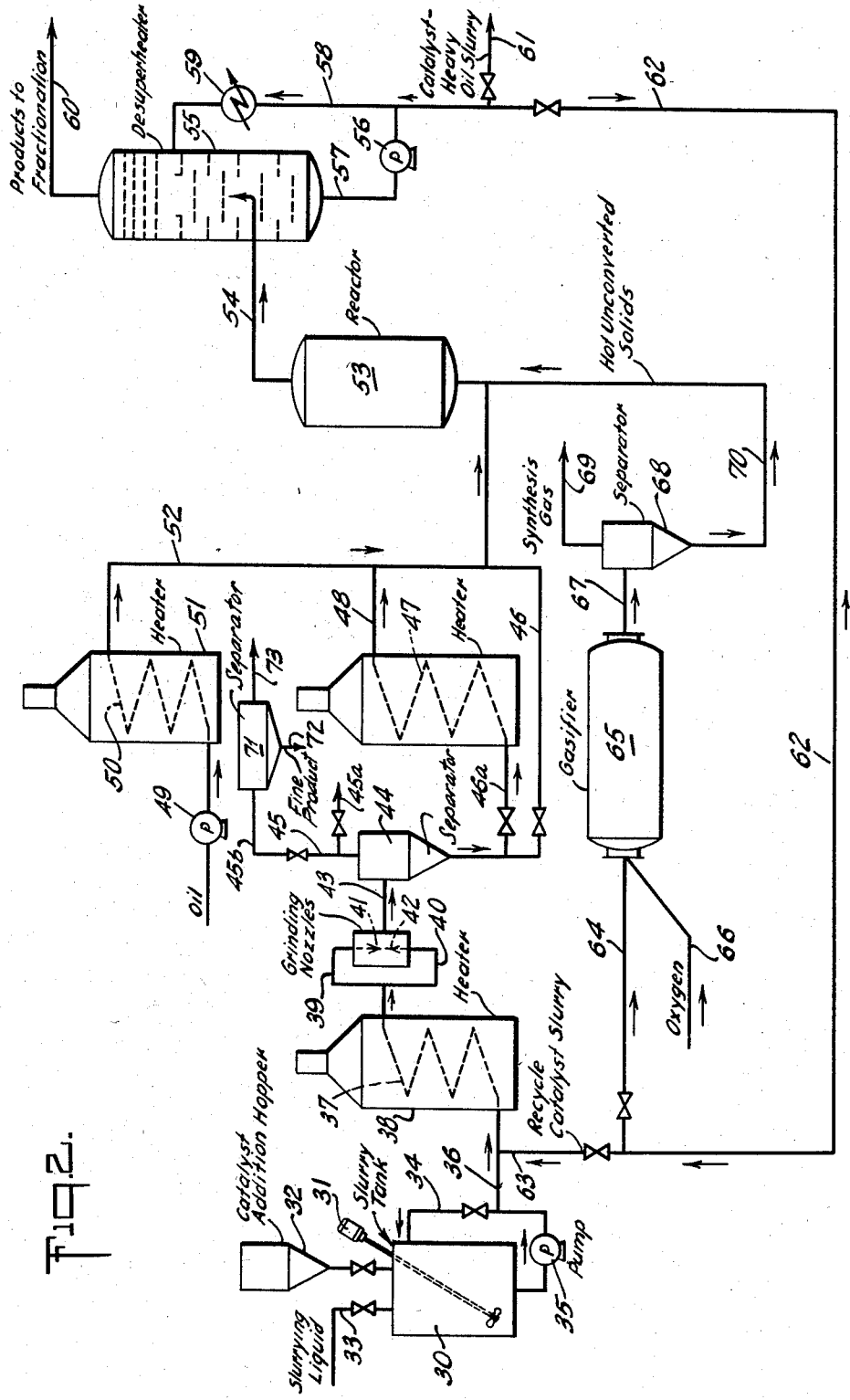

United States Patent Office 2,908,634
Patented Oct. 13, 1959

2,908,634

HYDROCARBON CONVERSION PROCESS

William M. Stratford, New York, N.Y., assignor to Texaco Inc., a corporation of Delaware Application February 8, 1956, Serial No. 564,227

4 Claims. (Cl. 208—113)

This invention relates to the conversion of hydrocarbons in the presence of catalysts in solid particle form. More particularly, it is directed to a catalytic conversion process wherein the reaction is catalyzed by a solid contact material in finely powdered activated form and the contact material is maintained in such form during continuous use in the process.

In accordance with the invention a slurry of flowable mixture of particulate solid contact material and vaporizable liquid is passed as a continuous stream through a tubular heating zone under conditions of temperature and pressure such that vaporization of the liquid occurs and a continuously flowing gasiform stream containing finely powdered solid contact material suspended therein is established. Feed hydrocarbons are contacted with said solid material in a reaction zone maintained under conditions conducive for effecting the desired treatment and the treated hydrocarbons are separated from the powdered solid material.

Advantageously the stream of vaporized liquid containing suspended particles is subjected to conditions of high velocity flow and turbulence such that the suspended solids undergo pulverization, for example, such that about 90 percent or more of the pulverized material is in the form of particles of less than 50 microns and preferably not exceeding 5 to 10 micron size. The aforesaid pulverizing action may occur in the presence of the hydrocarbons undergoing treatment and, advantageously prior to passage through the reaction zone, although it is contemplated that such pulverizing action may take place within the reaction zone.

In one embodiment of the invention, particularly applicable to cracking of hydrocarbons in the presence of solid carbonaceous material, for example coke, in finely divided activated form as a catalyst, the catalytic material is mixed with a liquid, for example water, to form a slurry and the resulting slurry passed through a tubular heating zone wherein substantially all of the liquid is vaporized to form a stream of vapor containing the contact material suspended therein. This vapor stream is preferably subjected to high velocity flow through a constricted zone or zones, for example through opposed nozzles or jets, whereby as a result of impact between particles, disintegration and pulverization occurs. Feed hydrocarbons, preheated if necessary, are injected into the resulting stream during continued flow at high velocity and the resulting mixture passed through the hydrocarbon treating zone maintained under the desired treating temperature and pressure.

The contact material removed from the reaction zone may be recycled at least in part. It may also be desirable to reactivate the contact material prior to such recycling. Reactivation may be effected advantageously by subjecting the contact material removed from the reaction zone to partial oxidation with oxygen or an oxygen-containing gas. Hot, unconsumed contact material from the partial oxidation step is directed to the reaction zone to supply a portion of the suspended contact material, and a portion of the heat requirements of the hydrocarbon conversion step. Gas produced in the partial oxidation step may be employed for the synthesis of gasoline and chemicals. Carbon monoxide contained in the gas from the oxidation step may be subjected to reaction with steam to produce additional amounts of hydrogen. Hydrogen, so produced, is useful in the treatment of oils by hydrogenation or for the manufacture of chemicals.

A feature of the process of this invention is that carbonaceous catalysts, for example, coke, may be employed in hydrocarbon conversion processes. Although coke or carbon has been known to have catalytic activity for the cracking reaction, the aromatic nature of the higher boiling products produced has militated against the commercial use of these catalysts. Although aromatic hydrocarbons are desirable in gasoline because of their high octane numbers, the aromatics are undesirable in higher boiling fractions, such as diesel oil, light fuel oil and cracking stock, because of their poor burning and cracking characteristics. By the process of this invention, the advantage of producing a high octane number motor fuel can be exploited without the production of large quantities of low quality heavy oils. The high catalytic activity obtained in this process permits the attainment of high conversion levels not otherwise possible so that motor fuel in which aromatics are desired is the primary product and relatively small quantities of heavy oil are produced. Further, the small amount of heavy oil so produced may be effectively converted to motor fuel by recycling to the reaction zone.

From the description herein, it will be apparent to one skilled in the art that the process of this invention is adapted to many hydrocarbon conversion and treating processes. For example, but without limitation thereto, this invention may be advantageously employed in such diverse processes as catalytic cracking, hydrogenation, dehydrogenation, naphtha reforming, clay treating, isomerization, and desulfurization. The process may be applied to the conversion of vaporizable liquid hydrocarbons including those which are liquid only under superatmospheric pressure and at low temperature, for example, propane or ethane and those which may be completely vaporized only at high temperature under reduced pressure, for example gas oils and vacuum distillates. Although conventional catalysts for a given application may be employed, the enhanced catalytic effect resulting from the highly turbulent flow and catalyst attrition obtained in this process makes possible the use of catalysts of low intrinsic activity which are relatively inexpensive. For example, in one embodiment of this invention, carbon in the form of petroleum coke, is used to catalyze the cracking of hydrocarbon oil vapor.

An advantage of the process of this invention is that the catalyst and hydrocarbon undergoing conversion are brought into intimate contact with one another. The turbulent flow conditions employed result in high relative velocities of the catalyst and vapor and high rates of mass transfer. The hydrocarbon presented to the catalyst surface is continuously and rapidly changed. The catalyst attrition continuously produces new catalyst surface. The grinding or breaking up of the catalyst particles not only results in the generation of new surface but also results in the production of increased surface for a given weight of catalyst. A further effect of the catalyst attrition in this process is that accumulation of carbonaceous residues on the catalyst surface is effectively prevented. Similarly, surface deactivation by catalyst poisons is ameliorated by the constant cleansing of the catalyst surface.

The catalyst activity of carbonaceous catalyst may be further enhanced by employing water as slurrying medium so that upon vaporization, steam is produced which reacts with the carbonaceous catalyst to further increase its activity. Similarly, partial oxidation of particulate carbonaceous contact material effects activation of the carbonaceous material by reaction of oxygen with the particle surface and the exposure of new active surface.

The increased catalyst effectiveness, obtained by the process of this invention, may be exploited by using inexpensive catalysts or by using only small quantities of catalysts.

The increased catalyst effectiveness obtained by the process of this invention results in increased flexibility of the process in the choice of operating conditions. For example, effective conversion can be obtained at temperatures, pressures, space velocities and catalyst-to-oil ratios not otherwise possible.

Certain of the advantages of the present process are readily seen by comparing the process of this invention with the modern fluid catalytic cracking process. The fluid catalytic cracking process, highly efficient as it is, nevertheless, requires huge reactors or separators and enormous catalyst inventories. The process of this invention provides a great improvement over the fluid catalytic cracking process in reducing the size of the equipment and the amount of catalyst required, and moreover, furnishes a much more flexible process, particularly with reference to the type of charging stocks which may be used and as to the choice of conditions of operation.

In catalytic cracking, in accordance with this invention, catalyst is slurried with oil. The catalyst may be in relatively coarse particle form but capable of being slurried in the oil and carried in suspension therein. The slurry or suspension is pumped to the tubular heater at a sufficient velocity to maintain the catalyst in suspension in the liquid oil, for example 0.5 to 20 feet per second, preferably 2 to 10 feet per second, and is directed through the heater with vaporization and resultant acceleration in velocity. The rate of flow through the elongated heater is such that conditions of turbulent flow are maintained as vaporization proceeds and the catalyst is pulverized or comminuted by the attrition of the catalyst particles. Sufficient heat is applied in the heater to effect vaporization and to heat the catalyst to the desired catalytic conversion temperature.

The conversion temperatures suitable for catalytic cracking operation are generally in excess of 800° F. and are usually in the range of 900° F. to 1000° F. or even higher. With high rates of initial flow to the heater and with the increase in volume resulting from vaporization, extremely high velocities are obtainable in the vaporizing section of the heater. The velocity of flow in the vapor section of the heater should be at a minimum of about 25 feet per second, which is about the minimum velocity for carrying many materials through a tube in suspension in vapor. As a practical matter, to assure rapid and substantial attrition for commercial operation, the velocity is usually maintained above 150 feet per second and may run considerably higher up to some 1800 feet per second. In fact, velocities of such magnitude as to be within sonic rates of flow may be used with advantage. High inlet pressures to the heater are employed, such as pressures of 500 to 1000 pounds per square inch with outlet pressures of atmospheric pressure to about 100 p.s.i.g. The differential pressure through the heater results in high velocity and turbulent conditions of flow and the relatively low pressure at the outlet promotes vaporization and further increase in velocity.

By way of example, a suspension in gas oil of powdered coke of average particle size of 100 microns is introduced to a tubular heater of uniform tube diameter at the rate of 20 feet per second. Heating the stream to temperatures suitable for cracking of about 900 to 1000° F. and at a discharge pressure of about 30 p.s.i.g. raises the linear velocity to the order of 1500 feet per second in the vaporizing section. At this velocity, great turbulence exists and attrition of the catalyst effectively comminutes the catalyst to an average particle size of a few microns, thus greatly increasing the catalytic surface area and reducing the contact time required to obtain a given amount of catalytic cracking.

Pressures over a wide range may be advantageously employed for catalytic cracking by the process of this invention. For example, pressures of one or two atmospheres, as used in conventional fluidized catalytic cracking, or higher pressures on the order of 10 to 50 atmospheres may be employed. Yields of equal quality motor gasoline at constant gas oil conversion are increased by virtue of conducting the process of this invention at a pressure of 10 atmospheres as compared with conventional cracking pressures.

In one method of operation, in accordance with the invention, carbonaceous catalyst, such as petroleum coke, is slurried with water and passed through a tubular heater at a high rate of flow with resultant comminution of the coke particles and the concomitant activation of the coke by the steam. The oil charging stock is separately vaporized and the stream of oil vapors is merged with the fluidized and activated coke stream to effect cracking of the oil vapors.

In dehydrogenating normally gaseous hydrocarbons, such as butane or a mixture of butane and propane, an advantageous operation is to slurry the catalyst with liquid butane. The slurry is passed through a tubular heater at a velocity above about 150 feet per second with complete vaporization of the hydrocarbon. Turbulent flow conditions are produced with resultant comminution of the catalyst and dispersion thereof in the gaseous stream. The catalyst-containing stream of vaporized hydrocarbons and the comminuted constituents are subjected to a temperature in the range of about 600 to 1400° F. at subatmospheric pressure or pressures up to about 50 p.s.i.g. to effect the desired dehydrogenation.

From the foregoing description, it will be evident that in the practice of the invention it is necessary to have high rates of flow and highly turbulent conditions in order to effect the desired comminution of the catalyst. To effectively obtain these conditions, the materials are passed through tubular heaters of restricted diameters, such as internal diameters of some ½ to 3 inches. In order to avoid erosion of the tubes, insofar as is possible it is desirable to construct the tubular heater with a minimum of sharp bends and to streamline the conduit as far as is practicable. There is, no doubt, some comminution of the catalyst produced by contact with the metal walls of the conduit, but it is desirable to minimize this contraction insofar as it is possible and to rely on the attrition of the particles to effect the desired comminution. However, it has also been found that erosion may be minimized by flowing the dispersion at relatively low velocity through a tubular heating zone and then increasing the turbulence and absolute velocity of the particles, or their relative velocities with respect to one another, in a localized zone. One way proposed for locally increasing absolute velocity is to pass the dispersion of solid in vapor through a convergent-divergent nozzle at supersonic velocity while the velocity upstream of the nozzle is maintained relatively low, such as 100 feet per second or less, to prevent erosion. Another procedure for locally increasing relative velocities is to divide the slurry stream or the flowing dispersion stream into two parts, and then to impinge the resulting two flowing streams of solid dispersed in vapor against one another at high velocity by passing them through a pair of nozzles which are opposed to one another at 180°, more or less, as described in U.S. application Serial No. 360,188, filed June 8, 1953, now abandoned.

In the drawings:

Figure 2 is a flow diagram of a modification of the invention in which the catalyst is separately slurried and comminuted and then injected into the oil stream for catalytic cracking and provision is made for either recycle or reactivation of the catalyst or both.

Figure 1:
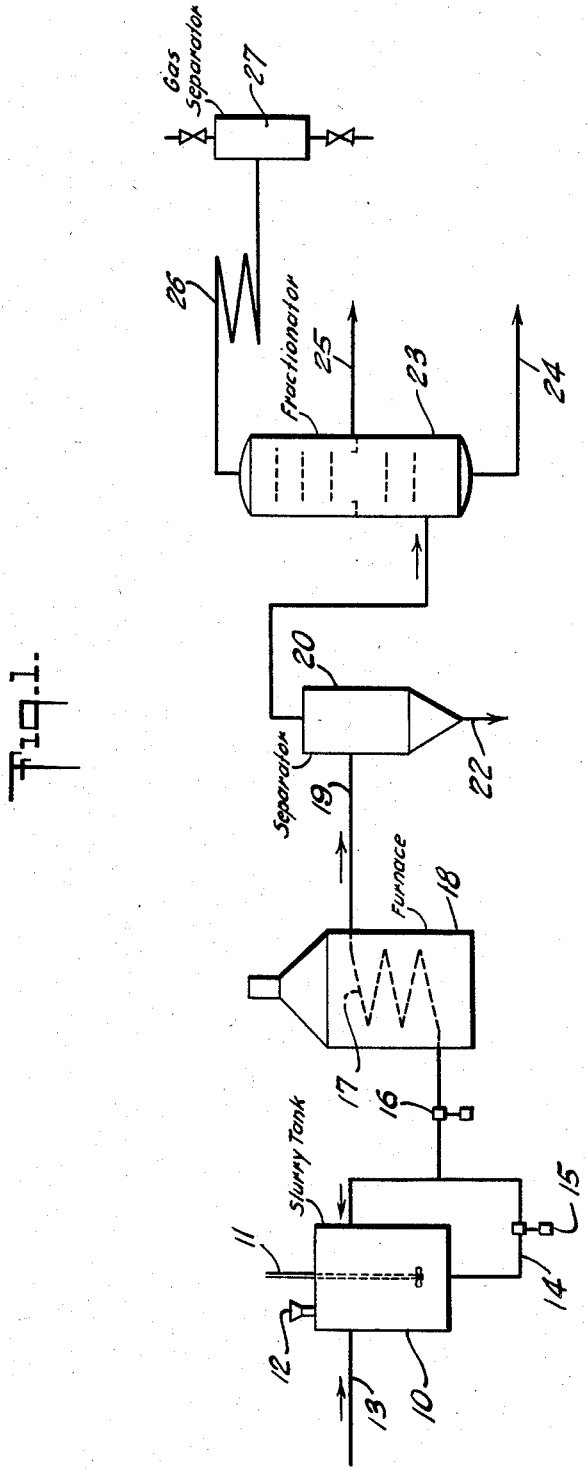
Figure 1 is a flow diagram of a preferred embodiment of the invention as applied to catalytic cracking.

As shown in Figure 1, a slurry tank 10 is provided with stirring or agitating means 11. Solid catalyst, for example coke or a conventional cracking catalyst, is admitted through a hopper 12 and hydrocarbon oil charging stock is supplied through a line 13. A circulating line 14 and pump 15 is provided for withdrawing slurry from the tank 10 and rapidly circulating it back to the tank. A pump 16 withdraws liquid slurry or suspension from the circulating line and directs it through a coil 17 disposed in a furnace 18. Coil 17 comprises both a heating zone and a tubular reaction zone. In transit through the coil, the oil is vaporized and the velocity increased to a rate above about 150 feet per second. Conditions of turbulent flow prevail; the catalyst is comminuted, and the oil is subjected to effective catalytic cracking. The stream of reaction products passes through a transfer line 19 to a cyclone separator 20. In the separator 20 separation of catalyst from oil vapors and gases takes place. The catalyst, with which may be included heavy residual products of reaction, is withdrawn through a line 22. The separated vapors and gases pass to a fractionator 23 wherein the vapors are fractionated to obtain desired fractions such as a heavy or fuel oil fraction withdrawn as bottoms through line 24; an intermediate or gas oil fraction taken off through line 25, and an overhead fraction, gasoline or a naphtha, which is condensed in the condenser 26 and collected in a receiving drum or gas separator 27.

In the system of Figure 2, a slurry tank 30 is provided with stirring or agitating means 31. Solid catalyst, for example coke or a conventional cracking catalyst, is admitted through a hopper 32 and a liquid medium, such as oil or water is introduced through a line 33. By means of a circulating line 34 and pump 35, a slurry or suspension of the catalyst is maintained in rapid circulation. Slurry from the circulating line 34 flows through line 36 to heating coil 37 disposed in a furnace 38. In transit through the coil, the liquid medium is substantially all vaporized to form a dispersion of catalyst particles in resulting vapor. The dispersion is separated into two streams in lines 39 and 40 and the resulting streams impinged one against the other by passing them through a pair of opposed nozzles 41 and 42. The comminuted effluent in the form of a fluidized stream of catalyst in the vapors is discharged through a transfer line 43 to separator 44. Separator 44 is a cyclone separator which may be used to remove excess steam when water is used as slurrying medium or it may be used to effect separation of an unusually fine fraction of the comminuted solids as will be described hereinafter. The amount of water required for satisfactory slurry feeding may produce more steam than is required for satisfactory suspension of the catalyst in vapor or more steam than is desired in the subsequent reaction zone. When separator 44 is used to remove excess steam, the steam is vented through line 45, and is discharged through line 45a for process or heating purposes not shown. A concentrated suspension of catalyst is withdrawn from separator 44 and is passed through line 46 to transfer line 52. Under conditions of operation such that expansion of the dispersed catalyst particles through the grinding nozzles reduces the temperature of the suspended catalyst to a temperature below the desired conversion temperature, the separated catalyst stream may be reheated by passing through line 46a to heating coil 47. Effluent from heating coil 47 is discharged through transfer line 48 to line 52.

The hydrocarbon oil to be subjected to catalytic cracking, from an external source not shown, is charged by pump 49 through a heating coil 50 disposed in a furnace 51. In transit through the coil the oil is preheated and subjected to vaporization. In the case of the lighter charging stocks, the oil is completely vaporized in the coil 50 and in the case of heavy residual stocks, the oil is partially vaporized. The coil effluent passes through a transfer line 52 wherein it is co-mingled with the catalyst stream from line 48 or 46a and the co-mingled constituents flow to reactor 53. Reactor 53 may be disposed as an upflow reactor as shown in Figure 2 so that the concentration of catalyst and residence time of the catalyst in the reaction zone is greater than that of the oil vapors undergoing conversion.

So long as the velocity of the vapors in the reactor exceeds the terminal velocity of the catalyst particles in the vapor under the force of gravity, the catalyst will remain dispersed in the vaporous stream. However, if the reactor diameter is selected so that the vapor velocity is less than the aforesaid terminal velocity, a dense phase of fluidized particles is formed. In the latter case, catalyst can be withdrawn from the dense phase of the reactor substantially free from the reactor vapors and the reactor vapors may be separately withdrawn substantially free of catalyst in a manner similar to that employed in the well known downflow fluid catalytic cracking process.

If desired, however, the reactor may be disposed so that the dispersion of catalyst in vapor is introduced at the top of the reactor and removed from the bottom. In which case, the catalyst velocity through the reaction zone is at least as great as that of the oil vapors. The gasiform reaction products and catalyst suspended therein are withdrawn from the reactor through line 54 and are passed to desuperheater 55. Desuperheater 55 serves to cool the reaction products to liquefy at least the highest boiling reaction products and to separate the catalyst from the remaining products as a slurry in the liquefied high boiling fraction. This is accomplished by circulating slurry by pump 56 through lines 57 and 58 and cooler 59 to a distributor tray in desuperheater 55. The cooled slurry cascades through suitable packing or baffles countercurrent to the incoming hot reaction products and catalyst. Reaction products free of entrained catalyst are withdrawn through line 60 to external fractionation not shown where gas, gasoline, middle distillates and other desired fractions are separated. Catalyst-heavy oil slurry may be withdrawn through line 61 for fuel or other use not shown. In the alternative, at least a portion of the catalyst-heavy oil slurry may be recycled through lines 62 and 63 to slurry line 36 in order to achieve further conversion of the heavy oil and reuse of the catalyst.

Advantageously, when employing a carbonaceous material such as coke as catalyst, the catalyst may be reactivated and the heavy oil converted to useful products by passing the catalyst-heavy oil slurry from line 62 through line 64 to gasifier 65. In gasifier 65, the catalyst-heavy oil slurry is subjected to partial oxidation with oxygen or an oxygen-containing gas from line 66 to convert all of the heavy oil and a part of the carbonaceous catalyst to a mixture of hydrogen and carbon monoxide, usually referred to as synthesis gas. Effluent from gasifier 65 is discharged through line 67 to cyclone separator 68. Synthesis gas separated in separator 68 is discharged through line 69 to other uses not shown. Hot unconverted catalyst is withdrawn from separator 68 through line 70 and is combined with the feed to reactor 53 in line 52 to provide a highly active catalyst and a part of the heat required for the cracking reaction.

As described above, separator 44 may be employed to separate a fine fraction of comminuted solids. In this case fine solids are removed from separator 44 entrained in the overhead gas in line 45, and the comminuted solids of larger particle size are withdrawn from the bottom of separator 44 through line 46 for use in the process as previously described. Entrained solids are passed through line 45 and 45b to separator 71. Separator 71 may comprise, for example, an electrostatic precipitator, bag filter, or other apparatus adapted for the separation of fine solid particles from gas or vapor. Fine product is withdrawn from separator 71 through line 72 and gas or vapor is discharged through line 73. The process of this invention may be employed generally to produce fine powders of solid catalysts useful for hydrocarbon conversion. This method of producing fine powders is particularly useful when carbonaceous catalysts are employed to produce a novel finely divided carbonaceous composition. This novel, finely divided carbonaceous material can be used effectively in many applications heretofore requiring carbonaceous blacks, for example carbon black and lamp black. Depending upon the conditions of the grinding operation and the fractional separation employed, fine particles in the range of about 5 to 30 millimicrons may be produced. Since the fine product is fractionally separated from the ground total product, the fine product comprises particles of substantially uniform size.

Although the invention has been described in connection with carbon or carbonaceous catalysts, it will be understood that more conventional catalysts such as silica alumina, molybdena alumina or chromia alumina may be used in the process of this invention. Also, when coke or carbonaceous catalysts are used, other catalytically active materials may be added as promoters or conjunctive catalysts.

Mention has already been made of forming a slurry of the solid particles in vaporizable liquid and then heating the resulting slurry mixture. As an alternative, a flowable paste of the particles in the liquid may be formed and this paste then injected into or mixed with a flowing stream of hot vapor under conditions to form a stream of particles dispersed in gasiform fluid. The stream containing dispersed particles is then brought into contact with the feed hydrocarbon before or after passage through a fluid energy grinding zone. As previously disclosed, the hot vapor may be all or a portion of the feed hydrocarbon stream.

Obviously many modifications and variations of the invention as hereinbefore set forth may be made without departing from the spirit and scope thereof and only such limitations should be imposed as are indicated in the appended claims.

I claim:

1. A process for the conversion of hydrocarbons which comprises forming a slurry of coke particles in a vaporizable liquid hydrocarbon, forcing said slurry into and through a heating zone, heating said slurry during passage through said heating zone to a temperature within the range of about 900 to 1000° F., vaporizing substantially all of said hydrocarbon component during passage through said heating zone forming therein a dispersion of coke particles in resulting vapor, passing said dispersion through a high velocity grinding zone at a velocity in excess of 150 feet per second, effecting cracking of said hydrocarbon and grinding of said coke, and discharging products of cracking and ground coke from said grinding zone.

2. A process for the conversion of hydrocarbons which comprises forming a slurry of coke particles in gas oil, forcing said slurry into and through a heating zone, heating said slurry during passage through said heating zone to a temperature within the range of about 900 to 1000° F. forming therein a dispersion of coke particles in resulting vapor, and passing said dispersion through a high velocity grinding zone at a velocity in excess of 150 feet per second, thereby effecting comminution of said coke and cracking of said gas oil.

3. In a process for cracking a liquid hydrocarbon in the presence of a solid carbonaceous catalyst, the improvement which comprises forming a flowable mixture of coke of about 100 microns average particle size in a vaporizable liquid hydrocarbon, introducing said mixture into an elongated heating zone at a velocity within the range of about 0.5 to 20 feet per second, vaporizing said liquid hydrocarbon forming a dispersion of said coke in hydrocarbon vapor, passing said dispersion through a portion of said heating zone at a temperature within the range of 900 to 1000° F. and at a velocity in excess of about 150 feet per second effecting concomitant comminution of said coke and cracking of said hydrocarbon.

4. In a process for cracking a gas oil in the presence of catalytically active coke, the improvement which comprises forming a flowable mixture of coke of about 100 microns average particle size in said gas oil, introducing said gas oil into an elongated heating zone at a velocity of about 20 feet per second, vaporizing said gas oil forming a dispersion of said coke in gas oil vapor, passing said dispersion through a portion of said heating zone at a temperature within the range of about 900 to 1000° F. and at a velocity of about 1500 feet per second effecting concomitant comminution of said coke and cracking of said gas oil.

References Cited in the file of this patent

UNITED STATES PATENTS

| | | |
|---|---|---|
| 2,364,145 | Huppke et al. | Dec. 5, 1944 |
| 2,377,716 | Read | June 5, 1945 |
| 2,384,967 | Schumacher et al. | Sept. 18, 1945 |
| 2,428,715 | Marisic | Oct. 7, 1947 |
| 2,433,798 | Voorhees | Dec. 30, 1947 |
| 2,471,104 | Gohr | May 27, 1949 |
| 2,592,591 | Odell | Apr. 15, 1952 |
| 2,598,309 | Say et al. | May 27, 1952 |
| 2,605,214 | Galstaun | July 29, 1952 |
| 2,619,449 | Sweetser | Nov. 25, 1952 |
| 2,721,168 | Kimberlin | Oct. 18, 1955 |
| 2,738,307 | Beckberger | Mar. 13, 1956 |
| 2,739,104 | Galbreath et al. | Mar. 20, 1956 |
| 2,743,171 | Janeway | Apr. 24, 1956 |
| 2,753,296 | Sellers | July 3, 1956 |
| 2,789,942 | Cooper et al. | Apr. 23, 1957 |